United States Patent
Shroff

(10) Patent No.: US 12,250,319 B2
(45) Date of Patent: Mar. 11, 2025

(54) ASIC IDENTITY AUTO-PROVISIONING

(71) Applicant: Cisco Technology, Inc., San Jose, CA (US)

(72) Inventor: Chirag K. Shroff, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 190 days.

(21) Appl. No.: 18/177,278

(22) Filed: Mar. 2, 2023

(65) Prior Publication Data

US 2024/0297793 A1    Sep. 5, 2024

(51) Int. Cl.
| | |
|---|---|
| H04L 9/40 | (2022.01) |
| H04L 9/08 | (2006.01) |
| H04L 9/30 | (2006.01) |
| H04L 9/32 | (2006.01) |

(52) U.S. Cl.
CPC .......... H04L 9/3236 (2013.01); H04L 9/0869 (2013.01); H04L 9/30 (2013.01)

(58) Field of Classification Search
CPC ..... G06F 21/73; H04L 9/3236; H04L 9/0869; H04L 9/30
See application file for complete search history.

(56) References Cited

U.S. PATENT DOCUMENTS

| | | | | |
|---|---|---|---|---|
| 10,318,723 | B1 * | 6/2019 | Paczkowski | ........ G06F 15/7825 |
| 2005/0289343 | A1 * | 12/2005 | Tahan | .................... G06F 21/72 |
| | | | | 713/169 |
| 2018/0091313 | A1 | 3/2018 | Li et al. | |
| 2018/0189194 | A1 | 7/2018 | Halpern | |
| 2019/0245702 | A1 | 8/2019 | Ben Simon et al. | |
| 2021/0096840 | A1 | 4/2021 | Kotary et al. | |
| 2021/0349836 | A1 * | 11/2021 | Benedict | ............. G06F 12/1433 |
| 2022/0067127 | A1 * | 3/2022 | Covolato | ................ G06F 21/44 |
| 2022/0222347 | A1 | 7/2022 | Sheth et al. | |
| 2022/0358220 | A1 | 11/2022 | Smith et al. | |

(Continued)

FOREIGN PATENT DOCUMENTS

WO    2022125714 A1    6/2022

OTHER PUBLICATIONS

European Search Report in European Patent Application No. 24155949. 1, dated Apr. 23, 2024, 10 Pages.

*Primary Examiner* — Thaddeus J Plecha
(74) *Attorney, Agent, or Firm* — Baker Botts L.L.P.

(57) ABSTRACT

In one embodiment, a method to authenticate a hardware component, by a system, includes performing a verification process to determine whether the hardware component is authorized to run on the system. The hardware component comprises an electronic fuse storing a hash of a data package and a memory storing the data package, wherein the electronic fuse is configured to provide the hash to the memory. The verification process comprises transmitting a random value (K) to the hardware component to prompt the hardware component to sign a response. The verification process further comprises receiving a signed response containing the random value (K) and the data package, wherein the data package comprises a first serial number associated with the hardware component and a first system number associated with the system. The verification process further comprises decrypting the signed response to verify a value of the random value (K).

20 Claims, 2 Drawing Sheets

(56) References Cited

U.S. PATENT DOCUMENTS

2022/0382866 A1  12/2022  Shroff et al.
2022/0382912 A1  12/2022  Shroff et al.
2022/0385462 A1  12/2022  Shroff et al.

* cited by examiner

ASIC IDENTITY AUTO-PROVISIONING

TECHNICAL FIELD

The present disclosure relates generally to hardware security, and more particularly, to identity auto-provisioning for a hardware component.

BACKGROUND

An application-specific integrated circuit (ASIC) generally refers to an integrated circuit designed for a specific purpose. An ASIC tends to be quite efficient at performing the specific purpose for which it was designed—as opposed to general-purpose circuits, like General Processing Units (GPUs) or Central Processing Units (CPUs), which can perform many different functions, but often less efficiently. A product may include a number of ASICs. As one example, the product could be a switch or a router that includes different ASICs to support different protocols. Other ASICs could be included for other purposes. ASICs typically do not have enough memory for identity storage, and there exists a need to ensure a system operates with an ASIC only after verifying the ASIC identity.

DESCRIPTION OF EXAMPLE EMBODIMENTS

Overview

Figure 1:
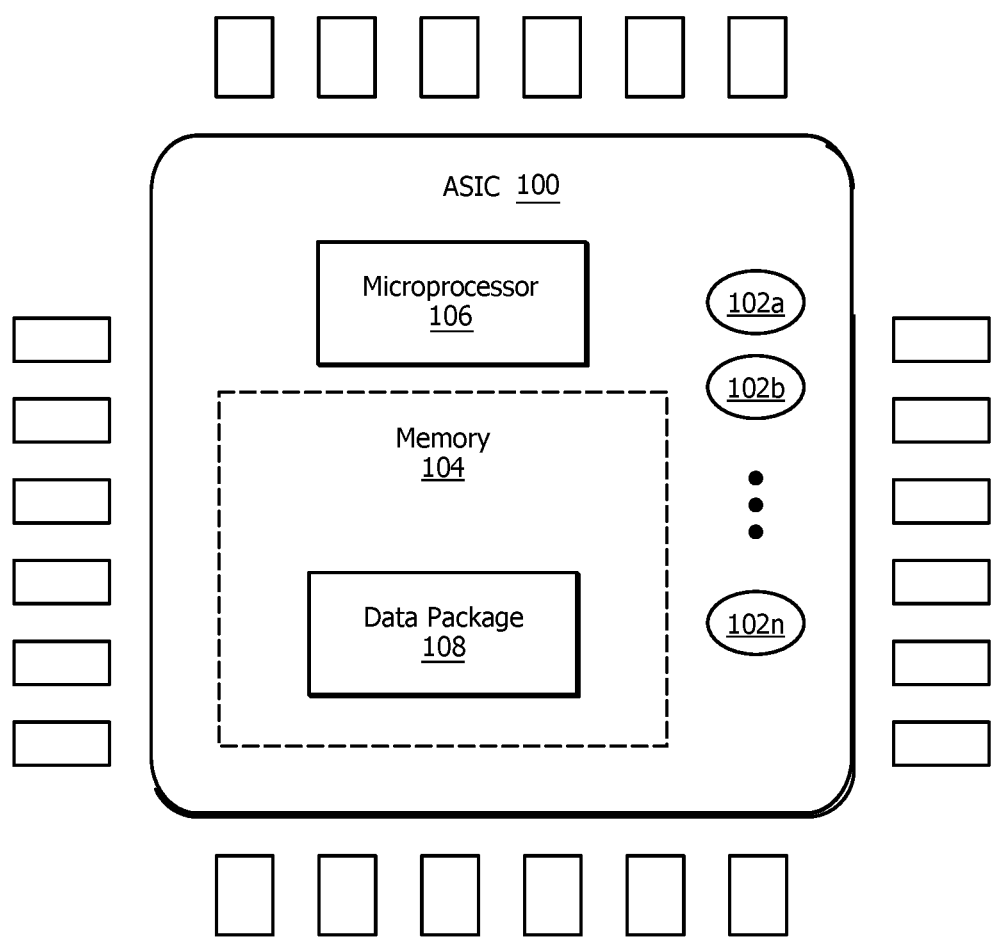
FIG. 1 illustrates an example hardware component.

In particular embodiments, a system may comprise one or more processors, a hardware component, and one or more computer-readable non-transitory storage media coupled to one or more of the processors. The hardware component comprises at least one electronic fuse configured to store a hash of a data package. The hardware component further comprises a memory configured to store the data package, wherein the data package comprises a field indicating the hash, wherein the at least one electronic fuse is configured to provide the hash to the memory. The one or more computer-readable non-transitory storage media may comprise instructions operable when executed by one or more of the processors to cause the system to perform a verification process to determine whether the hardware component is authorized to run on the system. The verification process may comprise transmitting a random value (K) to the hardware component to prompt the hardware component to sign a response and receiving a signed response containing the random value (K) from the hardware component. The verification process may further comprise receiving a hash of the data package from the hardware component, and the data package comprises a first serial number associated with the hardware component and a first system number associated with the system. The verification process may further comprise decrypting the signed response to verify a value of the random value (K).

In particular embodiments, a method, by a system, to authenticate a hardware component of the system may comprise performing a verification process to determine whether the hardware component is authorized to run on the system. The hardware component comprises at least one electronic fuse configured to store a hash of a data package. The hardware component further comprises a memory configured to store the data package, wherein the data package comprises a field indicating the hash, wherein the at least one electronic fuse is configured to provide the hash to the memory. The verification process may comprise transmitting a random value (K) to the hardware component to prompt the hardware component to sign a response and receiving a signed response containing the random value (K) from the hardware component. The verification process may further comprise receiving a hash of a data package from the hardware component, and the data package comprises a first serial number associated with the hardware component and a first system number associated with the system. The verification process may further comprise decrypting the signed response to verify a value of the random value (K).

In particular embodiments, one or more computer-readable non-transitory storage media may embody software that is operable, when executed by a processor, to: perform a verification process to determine whether a hardware component is authorized to run on a system. The hardware component comprises at least one electronic fuse configured to store a hash of a data package. The hardware component further comprises a memory configured to store the data package, wherein the data package comprises a field indicating the hash, wherein the at least one electronic fuse is configured to provide the hash to the memory. The software may be operable, when executed, to transmit a random value (K) to the hardware component to prompt the hardware component to sign a response and to receive a signed response containing the random value (K) from the hardware component. The software may be further operable, when executed, to receive a hash of a data package from the hardware component, and the data package comprises a first serial number associated with the hardware component and a first system number associated with the system. The software may be further operable, when executed, to decrypt the signed response to verify a value of the random value (K).

Technical advantages of certain embodiments of this disclosure may include one or more of the following. Certain systems and methods described herein may increase security and protect a product from counterfeiting or gray market modifications. Certain embodiments may provide the increased security while avoiding putting undue burden on the ASICs to perform advanced security and/or cryptographic features. In this manner, the ASICs retain capacity to perform their usual product-related functionality. Certain embodiments may provide the increased security while avoiding costs that would otherwise be required to add a trust anchor to every ASIC.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In general, a product, such as a switch, a router, or other product comprising hardware, may include a number of ASICs. It can be difficult to verify that each ASIC is authorized for use in the product. For example, a typical ASIC, by itself, has very limited cryptographic capability, making it difficult to authenticate the ASIC. This leaves products vulnerable to certain types of counterfeiting or gray market modifications. For example, a supply chain attack might try to add an unauthorized third party ASIC (i.e., an ASIC acquired outside of the product manufacturer's control) to the product manufacturer's base product in order to create a gray market product.

One way of securing a product is to use a trust anchor. A trust anchor comprises tamper-resistant hardware configured to perform cryptography. The trust anchor may support signatures to facilitate public key encryption. Although using a trust anchor improves security, it can increase costs and would use capacity of the ASIC or product that could otherwise be used for the ASIC's usual product-related functionality.

Certain embodiments described herein provide for authentication of the ASIC for a given product. The present disclosure contemplates generating and assigning a data package to the ASIC for a given product, and a hash of the data package may be stored in the ASIC during manufacturing. When the ASIC is incorporated into a product, the product may authenticate that the correct ASIC has been incorporated by comparing its own stored data to the data provided via the hash of the data package. This comparison provides authentication of the ASIC without requiring the ASIC to store all necessary data in its limited memory and avoids requiring a third-party customer to alter existing manufacturing processes. Further, the present disclosure provides authentication between the product and the incorporated ASIC without external communication to a back-end server.

FIG. 1 illustrates an example hardware component 100 for use in a product. In embodiments, the hardware component 100 may be an ASIC. In certain embodiments, a manufacturer of a product that is configured to use one or more hardware components 100 issues a certificate to establish that a given hardware component 100 is authorized to operate with the product. In general, the product may perform an assessment of the hardware component 100 to ensure that the manufacturer has authorized the hardware component 100 to be used in the product. In embodiments, the product may use one or more trust anchors for the assessment. The product may perform the assessment at any suitable time in order to verify hardware component 100. Additionally, the product can perform any suitable number of assessments in order to verify any suitable number of hardware components 100, such as all hardware components 100 of a product or a subset of hardware components 100 (e.g., a subset of ASICs that the manufacturer considers important to verify based on vulnerability of the ASIC to gray market modifications, cost of the ASIC, functionality performed by the ASIC, whether the ASIC has previously passed an assessment, and/or other factors).

The product may determine when an assessment has been triggered. For example, the assessment may be triggered at a boot time of the product, in response to a demand by the product's Operating System (OS), in response to detecting that a hardware component 100 has been changed or added to the product, or in response to a demand by an entity. In embodiments, the entity may be associated with the manufacturer of the product, and the entity may be configured to initiate an assessment in order to take an inventory of all hardware components 100 on the product to confirm that the manufacturer has authorized the hardware components 100 for use with the product.

Each hardware component 100 may comprise its own long-term key (LTK). As an example, the LTK may be a symmetric key. In another example, the hardware component 100 may have a public/private key. The LTK may be used to secure communication between the hardware component 100 and the product. The hardware component 100 may be configured to use key-based encryption to decrypt and authenticate messages from the product. Similarly, the product may use key-based encryption to decrypt and authenticate messages from the hardware component 100. In embodiments, the product may require hardware component 100's LTK to perform encrypted communications with the hardware component 100 and may determine hardware component 100's LTK in a manner that protects the security of the LTK. Certain embodiments may provide the product with the LTK of the hardware component 100 during manufacturing or at a later time. In these embodiments, the LTK may be communicated to the product via a back-end server or an entity over a communication network that is associated with the manufacturer of the product. The present disclosure contemplates providing direct communication of the hardware component 100's LTK to the product, without external communication to a back-end server or entity, by storing the LTK in the hardware component 100 during its manufacturing.

As illustrated, each hardware component 100 may comprise a plurality of electronic fuses 102a-n, a memory 104, and a microprocessor 106. In embodiments, each one of the plurality of electronic fuses 102a-n may be a microscopic fuse configured for use in the hardware component 100 (i.e., a computer chip). The plurality of electronic fuses 102a-n may allow for the dynamic real-time reprogramming of hardware components 100. Computer logic may generally be "etched" or "hard-wired" onto a hardware component 100 and cannot be changed after the hardware component 100 has finished being manufactured. By utilizing a set of electronic fuses, a manufacturer may allow for the circuits on a hardware component 100 to change while in operation. The plurality of electronic fuses 102a-n may be made out of silicon and/or metal traces. In embodiments, the plurality of electronic fuses may operate by electromigration, the phenomenon that electric flow causes the conductor material to move.

During manufacturing operations of the hardware component 100, one or more of the plurality of electronic fuses 102a-n may be configured to receive and store the LTK of the hardware component 100 through suitable means. Each one of the plurality of electronic fuses 102a-n may further be configured to receive and store data associated with a data package 108 (such as a hash of the data package 108, discussed further below). As illustrated, the memory 104 may be configured to store the data package 108. In embodiments, the data package 108 may correspond to an issued certificate that establishes the manufacturer trusts the product into which the hardware component 100 will be integrated. For example, the product may comprise a trust anchor, which may be an authoritative entity for which trust is assumed (rather than derived) based on the trust anchor having been issued a root certificate. In embodiments, the fields of the data package 108 may be equivalent to or the same as those of an issued certificate. Without limitations, the fields of the data package 108 may include a serial number associated with the hardware component, a product number or identifier associated with the product receiving the hardware component 100, a public key of the hardware component 100, and a hash of the data package. In embodiments, the hash of the data package 108 may be a value that collectively represents all the data stored in the data package 108. In certain embodiments, the hash of the data package 108 corresponding to a specific product integrating the hardware component 100 may be received and stored by at least one of the electronic fuses 102a-n during manufacturing operations of the hardware component 100. The product, once assembled and booted with the hardware component 100, may communicate with the hardware component 100 and receive a completed data package 108 for authentication. For example, the fields of the data package 108 may be partially completed after manufacturing, wherein the hash of the data package 108 may remain incomplete. The hash of the data package 108 may be recovered or transmitted from at least one of the electronic fuses 102a-n in which it was stored, wherein the memory 104 may receive the hash of the data package 108 and fill in the field of the data package 108 corresponding to the hash. During first boot of the assembled product, the product receives the completed data package 108 including the hash previously stored in one of the electronic fuses 102a-n of the hardware component 100, wherein the product may store the completed data package 108 for authorization during subsequent boots. For subsequent boots, the hardware component 100 may provide the completed data package 108 to the product, wherein the product may compare the newly received data package 108 to that already stored by the product. In these examples, transmissions between the hardware component 100 and the product may utilize private/public key encryption methods.

In particular embodiments, memory 104 may include main memory for storing instructions for microprocessor 106 to execute or data for microprocessor 106 to operate on. As an example and not by way of limitation, hardware component 100 may load instructions from storage or another source to memory 104. Microprocessor 106 may then load the instructions from memory 104 to an internal register or internal cache. To execute the instructions, microprocessor 106 may retrieve the instructions from the internal register or internal cache and decode them. During or after execution of the instructions, microprocessor 106 may write one or more results (which may be intermediate or final results) to the internal register or internal cache. Microprocessor 106 may then write one or more of those results to memory 104. In particular embodiments, microprocessor 106 executes only instructions in one or more internal registers or internal caches or in memory 104 (as opposed to storage or elsewhere) and operates only on data in one or more internal registers or internal caches or in memory 104 (as opposed to storage or elsewhere). One or more memory buses (which may each include an address bus and a data bus) may couple microprocessor 106 to memory 104. In particular embodiments, one or more memory management units (MMUs) may reside between microprocessor 106 and memory 104 and facilitate accesses to memory 104 requested by microprocessor 106. In particular embodiments, memory 104 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, memory 104 may include mass storage for data or instructions. In particular embodiments, memory 104 is non-volatile, solid-state memory. In particular embodiments, memory 104 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage or memory 104 taking any suitable physical form.

In particular embodiments, microprocessor 106 includes hardware for executing instructions, such as those making up a computer program. As an example and not by way of limitation, to execute instructions, microprocessor 106 may retrieve (or fetch) the instructions from an internal register, an internal cache, memory 104, or storage; decode and execute them; and then write one or more results to an internal register, an internal cache, memory 104, or storage. In particular embodiments, microprocessor 106 may include one or more internal caches for data, instructions, or addresses. This disclosure contemplates microprocessor 106 including any suitable number of any suitable internal caches, where appropriate. As an example and not by way of limitation, microprocessor 106 may include one or more instruction caches, one or more data caches, and one or more translation lookaside buffers (TLBs). Instructions in the instruction caches may be copies of instructions in memory 104 or storage, and the instruction caches may speed up retrieval of those instructions by microprocessor 106. Data in the data caches may be copies of data in memory 104 or storage for instructions executing at microprocessor 106 to operate on; the results of previous instructions executed at microprocessor 106 for access by subsequent instructions executing at microprocessor 106 or for writing to memory 104 or storage; or other suitable data. The data caches may speed up read or write operations by microprocessor 106. The TLBs may speed up virtual-address translation for microprocessor 106. In particular embodiments, microprocessor 106 may include one or more internal registers for data, instructions, or addresses. This disclosure contemplates microprocessor 106 including any suitable number of any suitable internal registers, where appropriate. Where appropriate, microprocessor 106 may include one or more arithmetic logic units (ALUs); be a multi-core processor; or include one or more processors 106. Although this disclosure describes and illustrates a particular processor, this disclosure contemplates any suitable processor.

Although FIG. 1 describes and illustrates particular components, devices, or systems carrying out particular actions, this disclosure contemplates any suitable combination of any suitable components, devices, or systems carrying out any suitable actions.

Figure 2:
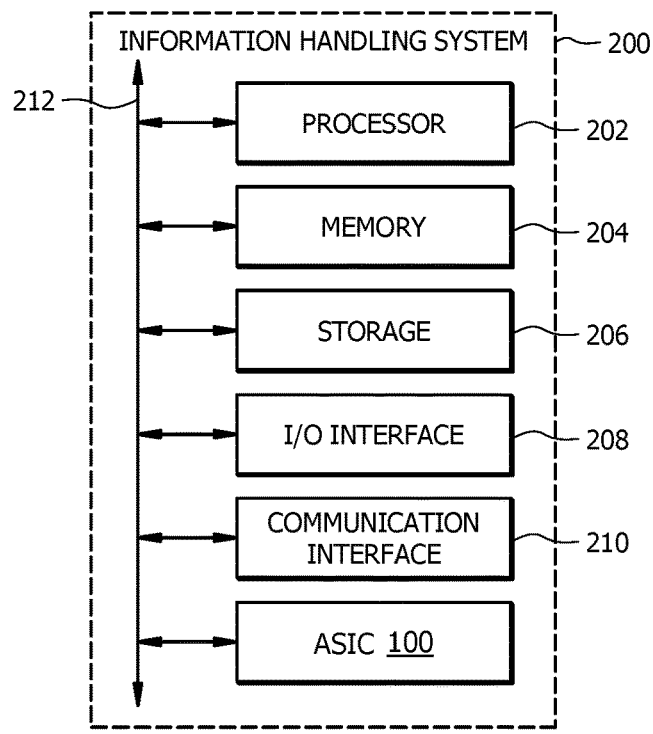
FIG. 2 illustrates an example information handling system.

FIG. 2 illustrates an example information handling system 200. In particular embodiments, one or more information handling systems 200 perform one or more steps of one or more methods described or illustrated herein. In particular embodiments, one or more information handling systems 200 provide functionality described or illustrated herein. In particular embodiments, software running on one or more information handling systems 200 performs one or more steps of one or more methods described or illustrated herein or provides functionality described or illustrated herein. Particular embodiments include one or more portions of one or more information handling systems 200. Herein, reference to an information handling system may encompass a computer or a computing device, and vice versa, where appropriate. Moreover, reference to an information handling system may encompass one or more computer systems, where appropriate. Further, the hardware component 100 in FIG. 1 may be incorporated into the illustrated information handling system 200. With reference to the present disclosure, the information handling system 200 may be the aforementioned product incorporating the hardware component 100, as described above with respect to FIG. 1. As such, "product" and "information handling system 200" may herein be used interchangeably.

This disclosure contemplates any suitable number of information handling systems 200. This disclosure contemplates information handling system 200 taking any suitable physical form. As example and not by way of limitation, information handling system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, information handling system 200 may include one or more information handling systems 200; be unitary or distributed; span multiple locations; span multiple machines; span multiple data centers; or reside in a cloud, which may include one or more cloud components in one or more networks. Where appropriate, one or more information handling systems 200 may perform without substantial spatial or temporal limitation one or more steps of one or more methods described or illustrated herein. As an example and not by way of limitation, one or more information handling systems 200 may perform in real time or in batch mode one or more steps of one or more methods described or illustrated herein. One or more information handling systems 200 may perform at different times or at different locations one or more steps of one or more methods described or illustrated herein, where appropriate.

In particular embodiments, information handling system 200 includes a processor 202, memory 204, storage 206, an input/output (I/O) interface 208, a communication interface 210, and a bus 212. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, information handling system 200 may load instructions from storage 206 or another source (such as, for example, another information handling system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to information handling system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between information handling system 200 and one or more I/O devices. Information handling system 200 may include one or more of these I/O devices, where appropriate. One or more of these I/O devices may enable communication between a person and information handling system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between information handling system 200 and one or more other information handling systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, information handling system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Information handling system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of information handling system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In embodiments, information handling system 200 may be configured to initiate a verification process (see FIG. 3) in order to take an inventory of all hardware components 100 integrated within the information handling system 200 to confirm that the manufacturer has authorized the hardware components 100 for use with that specific information handling system 200. In certain embodiments, information handling system 200 may detect a problem if hardware component 100 does not match any of the authorized hardware components 100. In response to detecting a problem, information handling system 200 can stop hardware component 100, initiate a notification to the manufacturer, and/or take other suitable actions. Otherwise, if hardware component 100 passes the verification process, information handling system 200 may allow hardware component 100 to continue running on information handling system 200. In this manner, a particular hardware component 100 that a manufacturer of information handling system 200 authorizes for use with information handling system 200 can be bound to that information handling system 200.

Figure 3:
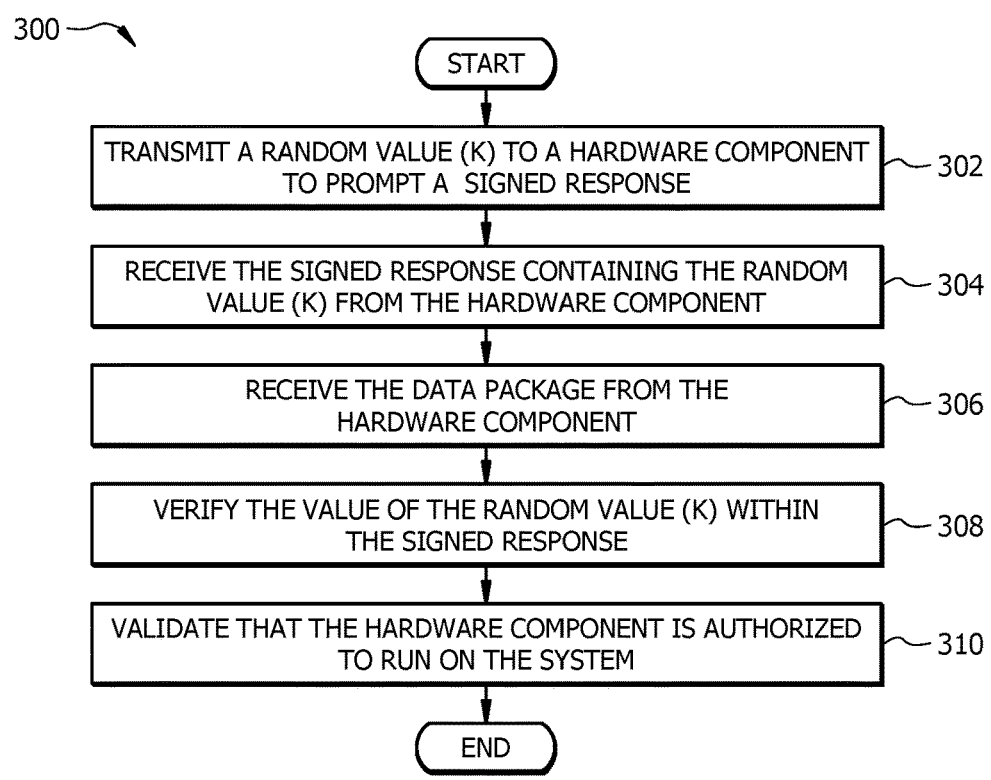
FIG. 3 illustrates an example method for authenticating a hardware component of a system.

FIG. 3 illustrates an example method 300 to authenticate hardware component 100 (referring to FIG. 1) of information handling system 200 (referring to FIG. 2). The method 300 may begin at step 302, where information handling system 200 may generate a random value (K) unique to a verification process performed for authorization. For example, for a verification process triggered at boot time, the random value (K) may be unique to that boot session. This random value (K) may be used when encrypting and decrypting communications between information handling system 200 and hardware component 100 for the verification process (e.g., during the current boot cycle/demand). The information handling system 200 may transmit the random value (K) to the hardware component 100 to prompt a response. In these embodiments, the hardware component 100 and information handling system 200 may be communicatively coupled together. The hardware component 100 may receive the random value (K) and sign the random value (K) with a private key.

At step 304, the hardware component 100 may transmit the signed random value (K) to the information handling system 200, wherein the information handling system 200 may receive the signed random value (K). At step 306, the hardware component 100 may transmit the data package 108 (referring to FIG. 1) stored in the hardware component 100 to the information handling system 200, wherein the information handling system 200 may receive the data package 108. In embodiments, the information handling system 200 may have previously received the data package 108 of the hardware component 100 during a first boot, wherein method 300 corresponds to subsequent boots. The previously received data package 108 may be compared to the received data package 108 from step 306 at a later step within method 300.

At step 308, the information handling system 200 may verify the value of the signed, random value (K) received by the hardware component 100. First, the information handling system 200 may be required to determine a public key associated with the private key used by the hardware component 100 to sign the random value (K) in step 302. In embodiments, the data package 108 may include the public key. The information handling system 200 may utilize the received hash of the data package 108 to determine the public key. For example, the information handling system 200 may parse the certificate chain, based on the hash, to a known root certificate and ensure that the data package 108 is issued by a known entity. The information handling system 200 may then retrieve the public key of the hardware component from that certificate and use it to validate that it received back the same random value (K) transmitted to the hardware component 100 in step 302 and later signed by that hardware component 100.

At step 310, the information handling system 200 may validate whether the hardware component 100 is authorized to run on that information handling system 200. In embodiments, the information handling system 200 may store data corresponding to the known root certificate, such as the serial number associated with the hardware component designated to be incorporated into the information handling system 200 and the product number or identifier associated with the information handling system designated to receive the hardware component 100. The information handling system 200 may compare the stored serial number of the hardware component 100 to the serial number provided by the known root certificate via the hash received from the hardware component 100 from step 306. The information handling system 200 may further compare the stored product number or identifier of the information handling system to the product number or identifier provided by the known root certificate via the same hash. If both comparisons align, the information handling system 200 may validate that the hardware component 100 is authorized to run on the information handling system 200.

In one or more embodiments, the information handling system 200 may have a previously received data package 108 stored in memory 204 (referring to FIG. 2) to be accessed for comparison to the received data package 108 from step 306. The current hardware component 100 incorporated with information handling system 200 may have transmitted the data package 108 stored in the memory 204 of information handling system 200 and/or the data package 108 from step 306. The hardware component 100 may be configured to input a hash of the data package 108 into the corresponding field of the data package 108 prior to transmission to the information handling system 200, wherein the hash may have been previously stored in at least one of the electronic fuses 102a-n (referring to FIG. 1) of the hardware component. Once the information handling system 200 receives the data package 108 from step 306, the information handling system 200 may validate whether the hardware component 100 is authorized to run on that information handling system 200 by comparing data between the received data package 108 from step 306 and the previously received data package 108 that is stored in memory 204. The method 300 may then end.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method to authenticate a hardware component of a system, including the particular steps of the method of FIG. 3, this disclosure contemplates any suitable method including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:
1. A system, comprising:
one or more processors;
a hardware component comprising:
at least one electronic fuse configured to store a hash of a data package;

a memory configured to store the data package, wherein the data package comprises a field indicating the hash, wherein the at least one electronic fuse is configured to provide the hash to the memory; and one or more computer-readable non-transitory storage media comprising instructions that, when executed by the one or more processors, cause one or more components of the system to perform operations comprising:

performing a verification process to determine whether the hardware component is authorized to run on the system, wherein performing the verification process comprises:

transmitting a random value (K) to the hardware component to prompt the hardware component to sign a response;

receiving a signed response containing the random value (K) from the hardware component;

receiving the data package from the hardware component, wherein the data package comprises a first serial number associated with the hardware component and a first system number associated with the system; and decrypting the signed response to verify a value of the random value (K).

2. The system of claim 1, wherein the hardware component is an application-specific integrated circuit (ASIC).

3. The system of claim 1, wherein the hardware component comprises a plurality of electronic fuses, wherein each one of the plurality of electronic fuses is configured to store at least one of the first serial number, a symmetric key, and the hash of the data package.

4. The system of claim 3, wherein the memory is configured to append the hash of the data package to the data package, wherein the hardware component is configured to transmit the hash of the data package with the data package.

5. The system of claim 1, wherein the operations further comprise determining a public key corresponding to the hardware component based on the received hash of the data package.

6. The system of claim 1, wherein the system is configured to store a second serial number associated with the hardware component and a second system number associated with the system, wherein the operations further comprise:

comparing the first serial number received from the data package to the second serial number;

comparing the first system number received from the data package to the second system number; and validating that the hardware component is authorized to run on the system.

7. The system of claim 1, wherein the operations further comprise determining to perform the verification process at boot time of the system.

8. A method to authenticate a hardware component of a system, comprising:

performing a verification process to determine whether the hardware component is authorized to run on the system, wherein the hardware component comprises:

at least one electronic fuse configured to store a hash of a data package;

a memory configured to store the data package, wherein the data package comprises a field indicating the hash, wherein the at least one electronic fuse is configured to provide the hash to the memory;

wherein performing the verification process comprises:

transmitting a random value (K) to the hardware component to prompt the hardware component to sign a response;

receiving a signed response containing the random value (K) from the hardware component;

receiving the data package from the hardware component, wherein the data package comprises a first serial number associated with the hardware component and a first system number associated with the system; and decrypting the signed response to verify a value of the random value (K).

9. The method of claim 8, wherein the hardware component is an application-specific integrated circuit (ASIC).

10. The method of claim 8, wherein the hardware component comprises a plurality of electronic fuses, wherein each one of the plurality of electronic fuses is configured to store at least one of the first serial number, a symmetric key, and the hash of the data package.

11. The method of claim 10, wherein memory of the hardware component is configured to append the hash of the data package to the data package, wherein the hardware component is configured to transmit the hash of the data package with the data package.

12. The method of claim 8, further comprising:

determining a public key corresponding to the hardware component based on the received hash of the data package.

13. The method of claim 8, further comprising:

comparing the first serial number received from the data package to a second serial number associated with the hardware component that is stored in the system;

comparing the first system number received from the data package to a second system number associated with the system that is stored in the system; and validating that the hardware component is authorized to run on the system.

14. The method of claim 8, further comprising:

determining to perform the verification process at boot time of the system.

15. A non-transitory computer-readable medium comprising instructions that are configured, when executed by a processor, to:

perform a verification process to determine whether a hardware component is authorized to run on a system, wherein the hardware component comprises:

at least one electronic fuse configured to store a hash of a data package;

a memory configured to store the data package, wherein the data package comprises a field indicating the hash, wherein the at least one electronic fuse is configured to provide the hash to the memory;

wherein performing the verification process comprises:

transmitting a random value (K) to the hardware component to prompt the hardware component to sign a response;

receiving a signed response containing the random value (K) from the hardware component;

receiving the data package from the hardware component, wherein the data package comprises a first serial number associated with the hardware component and a first system number associated with the system; and decrypting the signed response to verify a value of the random value (K).

16. The non-transitory computer-readable medium of claim 15, wherein the hardware component is an application-specific integrated circuit (ASIC).

17. The non-transitory computer-readable medium of claim 15, wherein the hardware component comprises a plurality of electronic fuses, wherein each one of the plurality of electronic fuses is configured to store at least one of the first serial number, a symmetric key, and the hash of the data package.

18. The non-transitory computer-readable medium of claim 17, wherein memory of the hardware component is configured to append the hash of the data package to the data package, wherein the hardware component is configured to transmit the hash of the data package with the data package.

19. The non-transitory computer-readable medium of claim 15, wherein performing the verification process further comprises:
- comparing the first serial number received from the data package to a second serial number associated with the hardware component that is stored in the system;
- comparing the first system number received from the data package to a second system number associated with the system that is stored in the system; and
- validating that the hardware component is authorized to run on the system.

20. The non-transitory computer-readable medium of claim 15, wherein performing the verification process further comprises:
- determining to perform the verification process at boot time of the system.

* * * * *